No. 12,226. REISSUED MAY 31, 1904.

S. W. MILLER.

SIPHON.

APPLICATION FILED SEPT. 14, 1903.

2 SHEETS—SHEET 1.

Witnesses:
William L. Hall
Earl H. Crawford

Inventor:
Sidney W. Miller
by Booth & Brown
his Attorney.

No. 12,226. REISSUED MAY 31, 1904.

S. W. MILLER.

SIPHON.

APPLICATION FILED SEPT. 14, 1903.

2 SHEETS—SHEET 2.

Witnesses:-
Earl H. Crawford
William H. Hall

Inventor:-
Sidney W. Miller
by Poole & Brown
his Attorneys.

No. 12,226. Reissued May 31, 1904.

UNITED STATES PATENT OFFICE.

SIDNEY W. MILLER, OF CHICAGO, ILLINOIS.

SIPHON.

SPECIFICATION forming part of Reissued Letters Patent No. 12,226, dated May 31, 1904.

Original No. 727,990, dated May 12, 1903. Application for reissue filed September 14, 1903. Serial No. 173,195.

*To all whom it may concern:*

Be it known that I, SIDNEY W. MILLER, of Chicago, in the county of Cook and State of Illinois, have invented certain new and useful Improvements in Siphons; and I do hereby declare that the following is a full, clear, and exact description thereof, reference being had to the accompanying drawings, and to the letters of reference marked thereon, which form a part of this specification.

This invention relates to improvements in automatic siphons, and refers more specifically to that class of siphons known as "double-trap" siphons, wherein the siphon is provided, in addition to a trap connected with the outlet-leg thereof, with an auxiliary trap having a less depth of seal than the main trap and designed to be forced or blown off before the main trap to bring the siphon into operation.

Among the objects of the invention is to provide, in a siphon equipped with main and auxiliary traps of the character referred to, means whereby the depth of seal of the auxiliary trap may be varied and said seal adjusted to a desired liquid-head in a tank or reservoir which is emptied by said siphon.

Another object of the invention is to provide means for filling the auxiliary trap from the liquid of the siphon-tank before said liquid has passed into or through the siphon.

A further object of the invention is to locate the auxiliary trap in such position that it may be readily accessible for the purpose of installing the same or adjusting or replacing it.

A still further object of the invention is to combine with the connections between the auxiliary trap and siphon a venting device whereby a part of said connection constitutes part of the venting device, thus simplifying the construction.

The invention consists in the matters hereinafter set forth, and more particularly pointed out in the appended claims.

Figure 1:
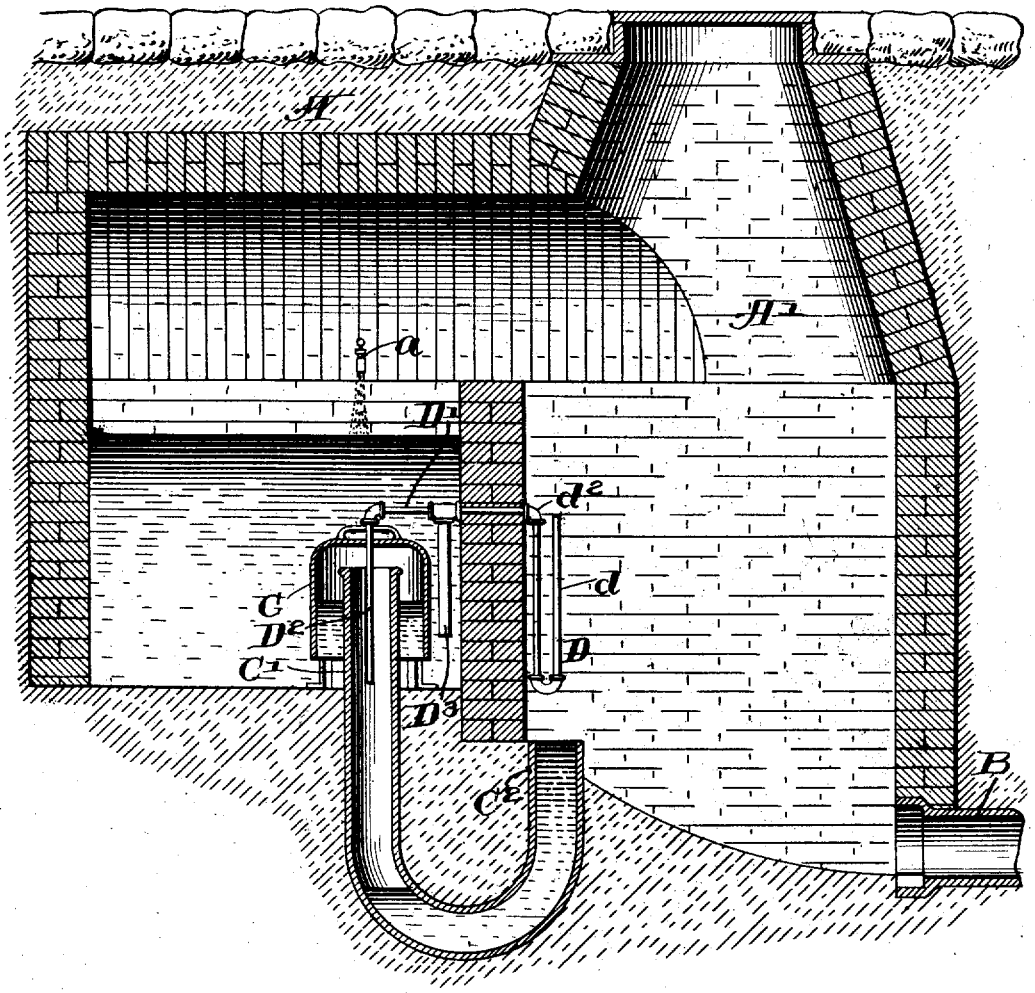
Figure 2:
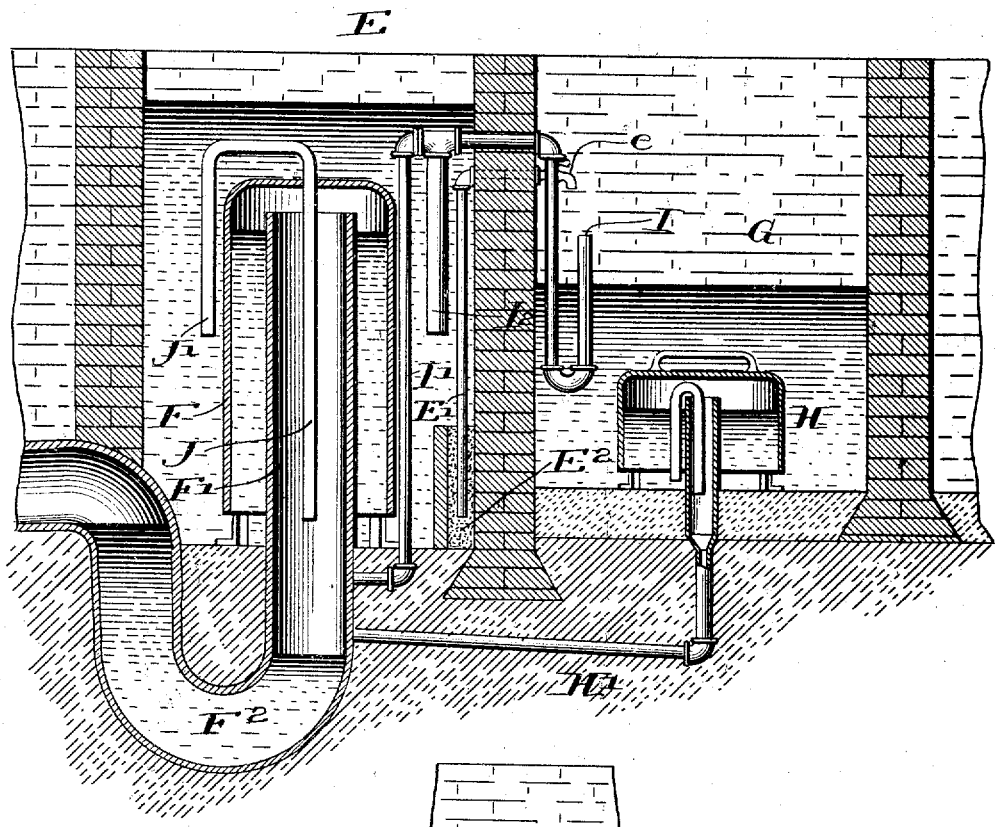
Figure 3:
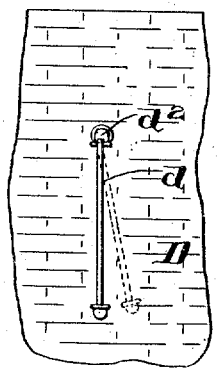

In the drawings, Figure 1 is a vertical section of a flush-tank and connected manhole, showing in vertical section an automatic siphon therein equipped with my invention. Fig. 2 is a vertical section of a time-siphon and its tanks or reservoirs, showing my improvements applied thereto. Fig. 3 is a detail illustrating one manner of varying the depth of seal of the auxiliary trap.

First referring to the construction shown in Fig. 1, A designates a sewer flush-tank having an arched top or roof. Said flush-tank is shown in this instance in connection with and adjacent to a manhole A′, though the invention may be applied to a siphon located in a single tank or reservoir. B designates a pipe leading from the manhole to the sewer to be flushed. The contents of the flush-tank is discharged into the manhole through a typical form of sealed siphon located in the tank A and from thence is directed to the sewer through the pipe B. Said tank is filled, through the medium of a valved pipe *a*, leading through the wall thereof, from any suitable source supplying liquid, and the period of flushing the sewer may be regulated by the time required to fill said tank through said pipe. The siphon for discharging the contents of the tank A consists of a short or intake limb C and a longer or outlet limb C′, which is connected with and discharges through a trap $C^2$, herein shown as having the form of a deep U-shaped trap, the shorter leg of which discharges into the manhole A′. The construction of the siphon and its main trap constitutes no part of the present invention and may be of any familiar or desired type. D designates an auxiliary blow-off trap having a less depth of seal than the main trap. Said auxiliary trap is herein shown as located in the manhole A′ and is connected with the siphon by means of a pipe D′, which communicates with the interior of the siphon. As herein shown, the end $D^2$ of said pipe D′ is turned downwardly and enters the siphon at a point below the level of the intake-limb of the siphon. By reason of the fact that the depth of seal in the trap D is less than that in the trap $C^2$ the head in the tank A required to set the siphon in operation will be measured by the depth of seal in said auxiliary trap. The auxiliary trap is so constructed and arranged that the depth of seal in the trap may be varied either for the purpose of adjusting the same to a given or required head in the tank or reservoir or for the purpose of varying the head in the tank required for setting the siphon in operation. Such adjustment may be effected by removing the shorter leg *d* of the trap and replacing the same by a longer or shorter leg or by changing the angle of the trap with respect to the vertical, and thereby increasing or decreasing the head in the seal, and therefore the strength thereof. This may be done by providing a rotative fit of the elbow $d^2$ with the pipe D′, by which the longer leg of the trap is attached to said connecting-pipe D′, so that the trap may be partially rotated about the axis of the said pipe D′. In Fig. 3 the trap is shown in full lines as occupying a vertical position in which the full depth of the trap is utilized and is shown in dotted lines as occupying an inclined position, thereby decreasing the depth of the seal. By reason of such adjustment of the auxiliary trap the volume of liquid discharged through the siphon at each operation thereof may be varied as desired. The location of said auxiliary trap outside the tank A, as in the manhole A′ or like accessible place, permits the ready adjustment of the auxiliary trap in the manner stated without the necessity of disturbing any of the setting or fittings of the siphon proper. Means are provided for automatically filling the auxiliary trap during each operation of the siphon, so that when the tank A is again being filled air will not be allowed to escape from the siphon through said trap. I have herein shown means for automatically filling said auxiliary trap from the liquid of the main tank or reservoir just after said trap has been forced and the air in the siphon displaced therethrough. Said filling means consists of a pipe $D^3$, depending from and communicating with the horizontal pipe D′, which connects the auxiliary trap with the siphon. The pipe D′, connecting said auxiliary trap with the main siphon, is shown as located below the highest level reached by the liquid in the tank or reservoir; but this arrangement is not essential so long as the connection between the refilling-pipe $D^3$ and said connecting-pipe is located below such maximum liquid-level. With this construction after such trap is forced and the air from the siphon escapes through said trap the liquid rushes through the pipe $D^3$ and the pipe D′ and fills the auxiliary trap before the level of the liquid drops below the pipe D′, so that when the tank is again filling the escape of air from the siphon through the auxiliary pipe is cut off. The pipe $D^3$ is made larger than the pipe D′, so as to insure the filling of the auxiliary trap notwithstanding the fact that a portion of the water passing through the pipe $D^3$ finds its way into the main siphon through the pipe D′ as said pipe is herein arranged. It will also be observed that in the construction shown in Fig. 1 the pipes D′ $D^2$ $D^3$ have the further function of a venting device for the siphon, by which the siphon is thoroughly vented after each operation thereof. The construction described is a desirable one for the reason that it simplifies the construction as a whole. The venting device may, however, be independent of the trap connecting and refilling pipe, as will appear from a consideration of the construction shown in Fig. 2 and hereinafter described.

In Fig. 2 I have shown my improvements applied to a timing-siphon of the general type shown in my prior United States Letters Patent, No. 702,066, granted June 10, 1902, said siphon being designed to intermittingly discharge a liquid-tank in such manner that the tank after it has once been filled remains filled for a determined period and thereafter is automatically discharged through said siphon. The construction shown in Fig. 2 is applicable for use to intermittingly discharge the contents of a filter or bacteria-bed constituting a part of a sewage-purifying plant, though it is obvious that the apparatus may be employed wherever it is desired to intermittingly charge or discharge a liquid-tank. In said figure, E designates a tank which may constitute part of or be connected with a tank containing a filter or bacteria-bed in which sewage after leaving the septic tank and is discharged upon the bed in the process of purifying the same is exposed for determined periods. The tank is emptied by the apparatus herein illustrated, consisting of a typical form of deep-seal siphon generally like that illustrated in Fig. 1, though differing in proportions and certain of its details. In said figure, F designates the intake or shorter limb of the siphon, and F′ the outlet or longer limb thereof. Said longer limb of the siphon discharges into and through a familiar form of trap, (indicated as a whole by $F^2$.) The operation of the apparatus shown in Fig. 2 is like that shown in my said prior patent, the trap being so proportioned that the greatest depth of liquid in the tank is not sufficient to set the siphon in operation. The liquid-head of said tank E is, like the prior construction, supplemented by pressure introduced into the siphon through the medium of an auxiliary siphon H, located in a chamber G at one side of the tank E, after the latter tank has been partially or completely filled. The longer limb of the auxiliary siphon communicates with a pipe H′, leading to the trap $F^2$ of the main siphon, said pipe H′ entering the trap of said main siphon below the sealing-level thereof, whereby the auxiliary siphon is sealed after each operation of the main siphon. The tank or reservoir E communicates with the timing-chamber through the medium of a pipe E′, which extends through the wall of the tank E, between the latter and chamber G, said pipe being provided with a valved outlet *e*, whereby the time required to fill the chamber G may be varied and the periods of rest of the sewage in the bacteria-bed correspondingly varied. The inlet end of the pipe E′ is shown as embedded in a filtering mass $E^2$ near the bottom of the tank E, whereby clogging of the pipe is prevented. The auxiliary blow-off trap, corresponding to the trap D of the previously-described construction, is in said Fig. 2 designated by the reference-letter I and is located within the timing-chamber G. Said trap is connected by means of a pipe I′ with the main siphon, said pipe being directed downwardly past the intaking limb of the siphon and entering the longer leg of the siphon or the trap connected therewith. The advantage of this construction is that the bell constituting the shorter limb of the siphon may be removed without disturbing the connections with the auxiliary trap. Said pipe I′ communicates with a filling-pipe $I^2$, which is located in the tank E and below the maximum liquid-level in said tank, whereby during the operation of the main siphon the liquid is forced through the pipes $I^2$ and I′ into and fills the auxiliary trap I in the same manner as described in connection with the like construction shown in Fig. 1. The siphon is provided with a familiar form of venting device consisting of a pipe J, which extends through the bell and into the longer limb of the siphon, and a part J′, located outside of the bell, and terminates above the lower edge thereof. Said venting-pipe is supported on the bell and is therefore removable therewith.

In the operation of the apparatus shown in Fig. 2 the flow of liquid to the bacteria-bed is so controlled that when filled the head in the tank E is insufficient to force the auxiliary trap I, and said trap is forced by the supplemental pressure exerted by the liquid-head in the timing-chamber G, thereby starting the siphonic action and emptying the tank E and the associated bacteria-bed. Thereafter the operation of the apparatus is like that shown in my prior patent before referred to, the contents of the timing-chamber being emptied through the siphon H. The trap I is refilled during each operation of the siphon, so as to prevent the escape of air therethrough during the next refilling of the tank E. In both constructions shown the auxiliary trap is located outside of the tank or reservoir containing the siphon; but it is to be understood that it is only essential that the trap be located with its open end outside of the space in the tank which is filled with liquid, so that it will not be submerged and filled directly from the liquid in the tank. For instance, it may be located in a chamber in the tank, separated from the liquid-space by a suitably-located partition, so long as it is accessible for the purpose of adjustment or for other purposes.

It is obvious that the structural details of my improved siphon may be widely varied to adapt the same to different uses, and I do not wish to be limited to such details except as hereinafter made the subject of specific claims. It is to be further understood that the combinations set forth in the several claims are intended to be separately claimed without restriction to the other features of the construction in connection with which they are illustrated.

I claim as my invention—

1. The combination with a siphon having a trapped discharge-limb, of an auxiliary trap having a less depth of seal than that of the main trap, and means for varying the depth of seal of the auxiliary trap.

2. The combination with a siphon having a trapped discharge-limb, of an auxiliary trap having a less depth of seal than that of the main trap, said trap being capable of swinging vertically whereby the depth of seal therein may be varied.

3. The combination with a siphon having a trapped discharge-limb, of an auxiliary trap having a less depth of seal than that of the main trap, a pipe connecting said auxiliary trap with said siphon, means for varying the depth of seal of the auxiliary trap, and a venting device connected with and forming a part of said connecting-pipe.

4. The combination with a tank and a siphon for emptying the same having a trapped discharge-limb, of an auxiliary trap communicating with the siphon and having a less depth of seal than that of the main trap, and means for varying the depth of seal of said auxiliary trap, said auxiliary trap being located so as to be accessible without disturbance of the siphon-setting.

5. The combination with a tank and a siphon for emptying the same having a trapped discharge-limb, of an auxiliary trap communicating with the siphon and having a less depth of seal than that of the main trap, means for varying the depth of seal of said auxiliary trap, said auxiliary trap being located so as to be accessible without disturbing the siphon-setting and means for refilling the auxiliary trap from the liquid in the tank before it has passed through the siphon.

6. The combination with a tank and a siphon for emptying the same, having a trapped discharge-limb, of an auxiliary trap communicating with the siphon and having a less depth of seal than that of the main trap, said auxiliary trap being located so as to be accessible without disturbance of the siphon-setting and means for refilling the auxiliary trap from the liquid in the tank before it has passed into the siphon.

7. The combination with a tank and a siphon for emptying the same, having a trapped discharge-limb, of an auxiliary trap communicating with the siphon and having a less depth of seal than that of the main trap, said auxiliary trap being located outside of the liquid-space of the tank, and means for refilling the auxiliary trap from the liquid in the tank before it has passed into the siphon.

8. The combination with a tank and a siphon for emptying the same, having a trapped discharge-limb, of an auxiliary trap having a less depth of seal than that of the main trap, said auxiliary trap being located outside of the tank and connected with the siphon by a pipe which extends through the wall of the tank, and means for filling the auxiliary trap from liquid in said tank before it has passed into said siphon.

9. The combination with a tank and a siphon for emptying the same, having a trapped discharge-limb, of an auxiliary trap having a less depth of seal than that of the main trap, said auxiliary trap being connected with the siphon by a pipe, and a pipe communicating with the last-mentioned pipe below the maximum liquid-level in the tank, and depending therefrom into the liquid in the tank, through which the auxiliary trap is filled during the operation of the siphon.

10. The combination with a tank and a siphon for emptying the same, having a trapped discharge-limb, of an auxiliary trap having a less depth of seal than that of the main trap, said auxiliary trap being connected with the siphon by a pipe which constitutes part of a venting device for the siphon.

11. The combination with a tank and a siphon for emptying the same, having a trapped discharge-limb, of an auxiliary trap having a less depth of seal than that of the main trap, said auxiliary trap being connected with the siphon by a pipe, and a pipe communicating with the last-mentioned pipe below the maximum liquid-level in the tank and depending therefrom into the liquid in the tank and through which the auxiliary siphon is filled during the operation of the siphon, said depending pipe constituting a part of a venting device for said siphon.

12. The combination with a tank and a siphon for emptying the same, having a trapped discharge-limb, of an auxiliary trap for said siphon having a less depth of seal than that of the main trap and means for refilling the auxiliary trap from the liquid in the tank before it has passed into the siphon.

13. The combination with a tank and a siphon for emptying the same, having a trapped discharge-limb, of an auxiliary trap having a less depth of seal than that of the main trap, said auxiliary trap being connected with the siphon by a pipe, and a pipe communicating with the last-mentioned pipe below the maximum liquid-level in the tank and depending therefrom into the liquid in the tank, through which the auxiliary trap is filled during the operation of the siphon, said depending pipe being made of greater cross-sectional area than the said connecting-pipe.

In testimony that I claim the foregoing as my invention I affix my signature, in presence of two witnesses, this 3d day of September, A. D. 1903.

SIDNEY W. MILLER.

Witnesses:

WILLIAM L. HALL,
GEORGE R. WILKINS.